Jan. 17, 1956  J. S. NEWHOUSE  2,731,031
BALL COCK
Filed Oct. 12, 1950
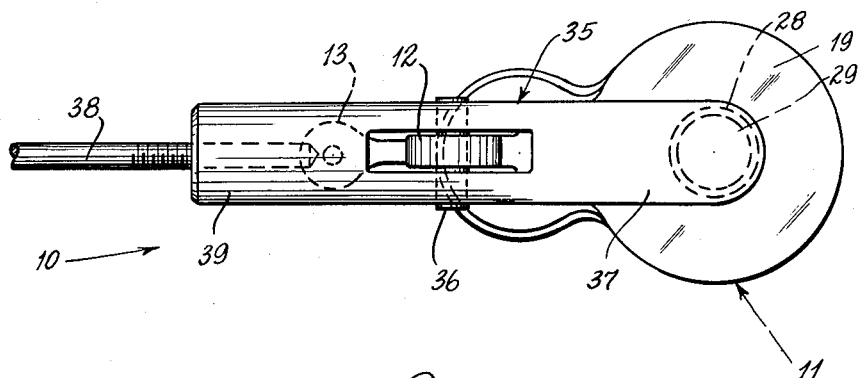
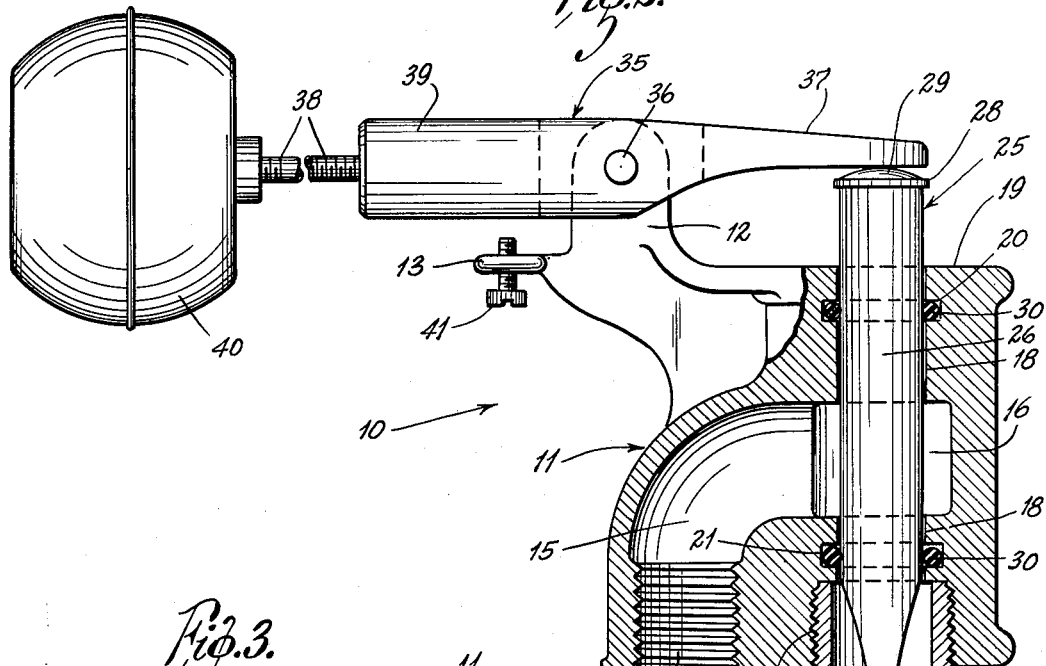
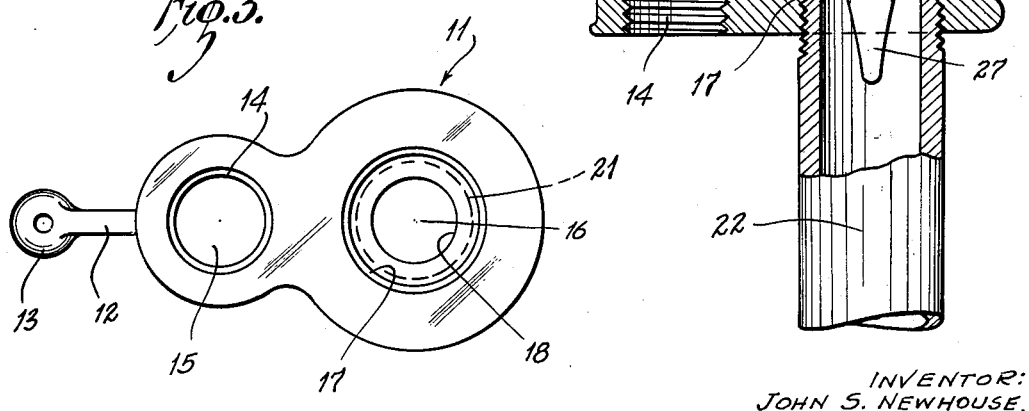
INVENTOR:
JOHN S. NEWHOUSE,
BY Kingsland, Rogers & Ezell
ATTORNEYS

United States Patent Office 2,731,031
Patented Jan. 17, 1956

2,731,031
BALL COCK

John S. Newhouse, St. Louis, Mo.

Application October 12, 1950, Serial No. 189,715

3 Claims. (Cl. 137—444)

The present invention relates to ball cocks, and more particularly to a ball cock employing a novel valve arrangement wherein yieldable packing rings cooperate with a cylindrical plunger to provide effective water seals.

It is an object of the invention to provide a ball cock for use in water closets and the like which will be smooth and positive in its shut-off action and which will be free of any tendency to vibrate or chatter.

It is another object of the invention to provide a ball cock in which the leverage available from a single pivoted lever is ample to effect closure against comparatively high water pressures.

It is another object of the invention to provide a ball cock in which the water seal may be effected by lateral pressure of a cylindrical plunger against a yieldable packing ring.

It is another object of the invention to provide a ball cock having a minimum number of individual parts, the parts themselves being formed as castings, or from commonly available stock, and requiring a minimum number of machining operations.

Other objects of the invention are to provide a ball cock of extremely simple design which is well adapted to perform the service for which it is intended, which may be readily dismantled for servicing or replacement of parts, and which is relatively inexpensive to manufacture.

Additional objects and advantages of the invention will be apparent from the following description of a specific embodiment thereof taken with the accompanying drawing, in which:

Fig. 1 is a top plan view of a ball cock constructed in accordance with the teachings of the present invention, a portion of a float lever extension rod being broken away, thereby also removing the float or ball from this view;

Fig. 2 is a side elevation of the ball cock of Fig. 1, the float or ball being here shown, but a portion of the float lever extension rod being removed and a portion of an inlet pipe being broken away in order to conserve space; and Fig. 3 is a bottom plan view of a valve body.

Referring to the drawing more particularly by means of the reference numerals thereon, the numeral 10 generally indicates a ball clock assembly constructed in accordance with the teachings of the present invention. The assembly 10 includes a valve body 11, preferably of cast metal such as brass or bronze, having any suitable external configuration, such, for example, as shown in the several figures of the drawing, and including a bracket 12 having an integral lug 13, as clearly shown in Figs. 1 and 2.

The internal construction of the body 11, as best shown in Fig. 2, comprises a threaded outlet 14 communicating by way of an outlet duct 15 with an internal cavity 16. Additionally, the body 11 has a threaded inlet 17 in axial alignment with a cylindrical bore 18 extending from the inlet 17 to the internal cavity 16 and extending also therebeyond to emerge at a top surface 19 of the body 11. It will be noted that the portion of the bore 18 disposed above the cavity 16 preferably has a length substantially in excess of its diameter. An annular groove 20 having a cross-section substantially as shown in Fig. 2 is formed in the wall of the bore 18 intermediate the cavity 16 and the top surface 19, and preferably nearer the latter. A second annular groove 21 having a cross-section substantially identical to that of the groove 20 is formed at the lower end of the bore 18 intermediate the cavity 16 and the threaded inlet 17. The body 11 is mounted by threaded engagement of the inlet 17 with an inlet pipe 22 adapted to convey water pressure to the inlet 17.

The bore 18 preferably has a smoothly finished cylindrical surface adapted to receive a similarly finished plunger 25 in close fitting, but freely slidable, engagement. The plunger 25 includes a cylindrical section 26 extending the greater portion of its length, a lower end section 27 of diminishing cross-sectional area, and an upper end section comprising a flange 28 and a convex head 29. The lower end section may be of any suitable shape providing a gradual reduction of cross-sectional area from that of the cylindrical section 26, such, for example, as the chisel-shaped section clearly shown in the drawing and which has been found to work very well. The upper end section, comprising the flange 28 and the convex head 29 may be machined from the parent stock of the plunger 25 or, as is obvious, may comprise a separate washer as the flange 28 and a convex headed drive pin or screw as the head 29.

A torous shaped sealing element or O-ring 30 of resilient material, such as rubber, neoprene or the like, is disposed in each of the annular grooves 20 and 21 in the bore 18. It is to be particularly noted that the overall outside diameter of the O-rings 30 and the diameter of both the groove 20 and the seat 21 are substantially identical, it being desirable to hold these particular dimensions to relatively close tolerances for smooth and effective action of the ball cock 10. The normal inside diameter of the O-rings 30 is, on the other hand, somewhat less than the diameter of the cylindrical section 26 of the plunger 25. It is thus obvious that the plunger 25 is adapted to compress the O-rings 30 in the groove 20 and the seat 21 and, thereby, to effect an efficient water seal at each of these points.

A float lever 35 of any suitable configuration, such, for example, as that clearly shown in the drawing, is pivotally attached to the bracket 12 by means of a pin 36 so as to dispose an arm 37 of the float lever 35 in bearing engagement with the convex head 29 of the plunger 25. A float lever extension rod 38 threadedly engages an arm 39 of the float lever 35 and extends therefrom a predetermined distance relatively remote from the pin 36 to a suitably attached hollow ball float 40 of well known type. An adjustable screw 41 is disposed in the lug 13 of the bracket 12 so as to limit the pivotal movement of the float lever 35 in a direction away from the aforementioned bearing engagement of the arm 37 with the convex head 29.

Operation

Fig. 2 depicts the ball cock 10 in a normal closed position, it being assumed that the ball float 40 is floating at the surface of a body of water such as that normally contained in a conventional water closet. Thus supported, the ball float 40, by virtue of the obvious mechanical advantage attained through its relatively remote position with respect to the pivot pin 36, is easily capable of maintaining the plunger 25 against upward movement due to the normal household water pressure which is assumed to exist in the inlet pipe 22. At the same time, the aforementioned seal effected by cooperation of the plunger 25, the lower O-ring 30 and the groove 21 precludes flow of water therepast, so that obviously no water is passed through the valve body 11.

If, as will occur during normal operation of the device, the aforementioned water surface is lowered, it is obvious that the unsupported weight of the ball float 40 will cause the float lever 35 to pivot in a counter-clockwise direction as shown in Fig. 2 until the arm 39 rests upon the adjustable screw 41. Obviously, with the float lever thus moved, the arm 37 will be lifted, whereupon the water pressure existing in the inlet pipe 22 is effective to force the plunger 25 upwardly. The seal at the lower O-ring is thus broken to enable water to flow past the lower end section 27 of the plunger 25 to the internal cavity 16, thence, through the duct 15 and the outlet 14. The seal effected at the upper O-ring 30 prevents water from squirting out the top of the valve body 11.

As the water which thus flows through the valve causes the surface thereof to rise and approach its original level, the float lever is gradually returned to its original position, thereby forcing the plunger downwardly, thereby gradually to diminish the flow of water until the seal at the lower O-ring is reestablished.

It is apparent that there has been provided a ball cock which fulfills the objects and advantages sought therefor. It is to be understood that the foregoing description and the accompanying drawing have been given by way of illustration and example. It is also to be understood that changes in the form or arrangement of the several parts or the substitution of equivalent elements, which will be readily apparent to those skilled in the art, are contemplated as within the scope of the present invention, which is limited only by the claims which follow.

What is claimed is:

1. A ball cock comprising a valve body having an internal cavity, an inlet, and an outlet, said inlet and said outlet each communicating with the internal cavity, said body having also a cylindrical bore formed coaxially with said inlet and extending therefrom through said internal cavity and to an outside surface of said body, there being a first annular recess formed in the wall of said bore intermediate said cavity and said inlet and a second annular recess formed in the wall of said bore intermediate said cavity and said outside surface, a yieldable annular element removably disposed in each of said recesses, a plunger slidably disposed in said bore, said plunger having a cylindrical section and a tapered section, said cylindrical section being in constant slidable engagement with said annular element disposed in said second annular recess and being intermittently slidably engageable with said annular element disposed in said first annular recess, said plunger being adapted to respond to water pressure existing at said inlet whereby to displace said cylindrical section from engagement with said annular element disposed in said first annular recess and to dispose a portion of said tapered section radially inwardly thereof, and means responsive to a variable water level whereby to restrain said plunger from response to said water pressure existing at said inlet when said water level is at a predetermined minimum height, said means being also adapted to displace said tapered section from a position radially inwardly of said annular element disposed in said first annular recess and thereby to effect smooth compressive sliding engagement of said cylindrical section therewith upon rise of said variable water level to said predetermined minimum height.

2. In a ball cock, in combination, a valve body having an inlet and an outlet, a plunger slidably disposed in said valve body, said plunger having a cylindrical section and a tapered section, and a resilient annular element disposed in said body between said inlet and said outlet for smooth slidable engagement progressively from said tapered section to said cylindrical section, said latter engagement being effective to provide a water seal between said inlet and said outlet.

3. In a ball cock, in combination, a valve body having an internal cavity, an inlet, and an outlet, said inlet and said outlet each communicating with the internal cavity, said body having also a cylindrical bore formed coaxially with said inlet and said cavity and extending through said body, there being an annular recess formed in the wall of said bore intermediate said inlet and said cavity, and a second annular recess formed in the wall of said bore beyond said cavity, a yieldable O-ring disposed in each of said recesses, and a plunger slidably disposed in said bore, said plunger having a tapered section and a cylindrical section, said cylindrical section having an outside diameter in excess of the normal inside diameter of said O-rings, said O-rings being adapted for smooth, yielding, sliding engagement first with said tapered section and subsequently with said cylindrical section thereby to effect a water seal on each side of said cavity, said plunger being adapted to move axially so as to enable said cylindrical section to be disengaged from said O-ring in the first of said annular recesses thus to open a passage between said inlet and said outlet.

References Cited in the file of this patent

UNITED STATES PATENTS

| | | |
|---|---|---|
| 578,372 | Strong | Mar. 9, 1897 |
| 715,726 | Wright | Dec. 9, 1902 |
| 798,629 | Anker-Holth | July 4, 1905 |
| 924,432 | Cornelius | June 8, 1909 |
| 943,755 | Morrison | Dec. 21, 1909 |
| 948,748 | Van Deusen | Feb. 8, 1910 |
| 1,041,824 | Loser | Oct. 22, 1912 |
| 1,320,132 | Gilmore | Oct. 28, 1919 |
| 1,494,786 | Kawalle | May 20, 1924 |
| 1,618,331 | Gilchrist | Feb. 22, 1927 |
| 2,229,601 | Park | Jan. 21, 1941 |
| 2,312,654 | Langdon | Mar. 2, 1943 |
| 2,360,733 | Smith | Oct. 17, 1944 |
| 2,520,573 | Smith et al. | Aug. 29, 1950 |
| 2,536,921 | Duke | Jan. 2, 1951 |
| 2,595,937 | Graham | May 6, 1952 |

FOREIGN PATENTS

| | | |
|---|---|---|
| 936,086 | France | Feb. 16, 1948 |